United States Patent
Mizutani et al.

[15] 3,665,053
[45] May 23, 1972

[54] PROCESS FOR PREPARING POLYMERS FROM ETHYLENICALLY UNSATURATED GLYCIDYL MONOMERS

[72] Inventors: Yukio Mizutani; Seishiro Matsuoka, both of Tokuyama-shi, Japan

[73] Assignee: Tokuyama Soda Kaubushiki Kaisha, Tokuyama-shi, Japan

[22] Filed: Nov. 25, 1969

[21] Appl. No.: 879,697

[30] Foreign Application Priority Data

Nov. 25, 1968 Japan.................................43/85602

[52] U.S. Cl. ..........................260/836, 260/830 R, 260/835, 260/873, 260/874, 260/878 R, 260/884, 260/895, 260/897 B, 260/897 R, 260/898, 260/899, 260/901
[51] Int. Cl.................C08g 45/04, C08g 39/10, C08f 37/18
[58] Field of Search..................................260/836

[56] References Cited

UNITED STATES PATENTS

| | | | |
|---|---|---|---|
| 3,423,481 | 1/1969 | Mizutani et al | 260/836 |
| 3,301,919 | 1/1967 | Cenci | 260/836 |

*Primary Examiner*—Paul Lieberman
*Attorney*—Sherman and Shalloway

[57] ABSTRACT

In the process for the preparation of finely divided high polymers of a cross-linked structure comprising polymerizing a monoethylenically unsaturated monomer and a diethylenically unsaturated monomer, in an organic solvent, an improvement characterized in that prior to the polymerization a linear polymer selected from the group consisting of hot n-heptane-soluble monoolefin polymers, polyalkylene oxides and vinyl chloride polymers is dissolved in said organic solvent.

6 Claims, No Drawings

PROCESS FOR PREPARING POLYMERS FROM ETHYLENICALLY UNSATURATED GLYCIDYL MONOMERS

This invention relates to a process for the preparation of finely divided high polymers having excellent dispersibility in organic solvents and resins. More particularly, it relates to an improved process for the preparation of finely divided high polymers of a cross-linked structure containing a functional group exhibiting by itself an affinity for dyestuffs.

It is generally known to improve the dyeability of difficulty dyeable polymers such as polyethylene, polypropylene, polyesters, e.g., polyethylene terephthalate, and polyvinyl chloride by blending therewith a polymer having an affinity for dyestufs. For instance, the specifications of U. S. Pat. No. 3,423,481 and British Pat. No. 1,132,645 teach the blending of a difficulty dyeable polymer with a finely divided high polymer of a particle size of less than 1 micron having a cross-linked structure and being obtained by polymerizing a monoethylenically unsaturated monomer containing a functional group, such as glycidyl, methacrylate, with a diethylenically unsaturated monomer such as divinyl benzene in the presence of an organic solvent which dissolves these monomers but not the cross-linked polymer produced and not the corresponding linear polymer containing no diethylenically unsaturated monomer; and disclose that in order to disperse the finely divided high polymer uniformly in the difficultly dyeable polymer it is preferable to polymerize said monoethylenically unsaturated monomer and diethylenically unsaturated monomer in the presence of an organic solvent in which powder of said difficultly dyeable polymer is dispersed.

The finely divided high polymer taught by such prior art has a cross-linked structure; therefore, it is advantageous in that is is thermally stable and the functionality of the polymer is neither lost nor degraded even if it is blended with the difficultly dyeable polymer under heating or subjected to melt shaping conditions. However, although such finely divided high polymer takes a form of fine particles of a diameter of less than 1 micron, it has a property of being easily agglomerated and hence, it is not always easy to disperse it finely and uniformly in the difficultly dyeable polymer. Of course, the finely divided high polymer can be relatively uniformly dispersed in the difficultly dyeable polymer when it is obtained by polymerizing said monoethylenically unsaturated monomer and diethylenically unsaturated monomer in the presence of the difficultly dyeable polymer of a powder form. But this polymerization method is apparently under various restrictions when it is conducted in an industrial large scale.

We have now found that finely divided high polymers of a cross-linked structure having a highly improved dispersibility in organic solvents and resins can be obtained when a monoethylenically unsaturated monomer and a diethylenically unsaturated monomer are polymerized in the presence of a specific polymer dissolved in an organic solvent, more particularly, in the presence of a solution of a polymer selected from the group consisting of hot heptane-soluble monoolefin polymers, polyalkylene oxides and vinyl chloride polymers in a specific organic solvent.

Accordingly, it is an object of this invention to provide an improved process for the preparation of finely divided high polymers of a cross-linked structure comprising polymerizing (1) a monomeric member selected from the group consisting of i. at least one radical-polymerizable monoethylenically unsaturated monomer (a) having a functional group selected from the group consisting of epoxy, acid anhydride, carboxyl, carboalkoxyl, carbamoyl, acyloxy and nitrogen-containing heterocyclic groups, and ii. a monomer combination of said monoethylenically unsaturated monomer (a) with a monoethylenically unsaturated comonomer (b) selected from the group consisting of monovinyl aromatic compounds, acrylonitrile, vinyl chloride and n-butene, and (2) 0.5 to 30 percent weight, based on the said monomeric member (1), of a diethylenically unsaturated monomer, in an organic solvent which dissolves said monomers (1) and (2) but not the cross-linked polymer produced and not the corresponding linear polymer free of said diethylenically unsaturated monomer (2) in the presence of a free-radical initiator; characterized in that prior to the polymerization a linear polymer selected from the group consisting of hot n-heptane-soluble monoolefin polymers, polyalkylene oxides and vinyl chloride polymers is dissolved in said organic solvent in an amount of 10 to 500 percent by weight based on the total of the monomers (1) and (2).

As the monoethylenically unsaturated monomer (a) to be used in this invention there max be cited (i) monoethylenically unsaturated monomers having an epoxy group such as glycidyl esters of ethylenically unsaturated carboxylic acids, e.g., glycidyl acrylate and glycidyl methacrylate, glycidyl ethers of ethylenically unsaturated alcohols e.g., allyl glycidyl ether, and 1,3-butadiene monoxide; (ii) intermolecular anhydrides of ethylenically unsaturated dicarboxylic acids such as maleic anhydride and itaconic anhydride; (iii) monoethylenically unsaturated monomers containing a carboxylic group such as acrylic acid, methacrylic acid, maleic acid, fumaric acid, itaconic acid and vinyl benzoic acid; (iv) monoethylenically unsaturated monomers containing a carboalkoxyl group such as methyl, ethyl, propyl and lauryl esters of acrylic and methacrylic acids; (v) monoethylenically unsaturated monomers containing a carbamoyl group such as acryl amide and methacryl amide; (vi) monoethylenically unsaturated monomers containing an acyloxy group, preferably, derived from a lower fatty acid, such as vinyl acetate and vinyl propionate; and (vii) monoethylenically unsaturated monomer containing a nitrogen-containing heterocyclic group such as vinyl pyridine, vinyl imidazole, vinyl pyrrolidone and vinyl carbazole.

These monoethylenically unsaturated monomers may be used singly or in combination of two or more. Further they may be used in combination with other monoethylenically unsaturated comonomer (b), which includes monovinyl aromatic compounds such as styrene, vinyl toluene, α-methyl styrene and vinyl ethyl benzene; acrylonitrile; vinyl chloride and n-butene. In case the monoethylenically unsaturated comonomer (b) is used, it is generally preferable that the ratio of the monoethylenically unsaturated monomer (a) : the monoethylenically unsaturated comonomer (b) is within a range from 1 : 0.1 to 1 : 10.

As the diethylenically unsaturated monomer (2) to be used in the process of this invention there may be named, for instance, divinyl benzene, divinyl toluene, divinyl sulfone and diallyl phthalate. Among these diethylenically unsaturated monomers, aromatic hydrocarbons having two vinyl groups such as divinyl benzene and divinyl toluene are particularly preferred for attaining the object of this invention. The use of conjugated diolefins of a chain structure such as 1,3-butadiene and 1,3-hexadiene is not suitable for attaining the object of this invention, because the introduction of a cross-linked structure into the resulting polymer is difficult when they are used.

The above mentioned diethylenically unsaturated monomer is used in an amount of 0.5 to 30 percent by weight based on the monoethylenically unsaturated monomer (1), especially 5 to 15 percent by weight. By using the diethylenically unsaturated monomer in an amount within this range, it is made possible to introduce a cross-linked structure into the resulting polymer and obtain a high polymer of a cross-linked structure in the form of fine particles having a diameter of less than 1 micron.

The most characteristic feature of this invention resides in that in conducting the polymerization of the above mentioned mono-ethylenically unsaturated monomer and diethylenically unsaturated monomer, a specific linear polymer is dissolved beforehand into a specific solvent to be used for the polymerization. The linear polymer to be made present in the polymerization system in the form of a solution in a specific solvent in the process of this invention includes 1 Polymers of monoolefins, for instance, expressed by the formula

in which $R_1$ stands for hydrogen, alkyl of up to four carbon atoms or phenyl and $R_2$ stands for hydrogen or alkyl of up to 4 carbon atoms; which are soluble in hot n-heptane, namely, which are dissolved when extracted with n-heptane at 98° C. (boiling point of n-heptane); such as atactic polypropylene, low molecular weight polyethylene having an average molecular weight of less than 30,000, preferably less than 10,000, polyisobutene, atactic polybutene-1, hot heptane-soluble ethylene-propylene copolymers inclusive of random copolymers and block copolymers, polystyrene, and ethylene-vinyl acetate copolymers having a vinyl acetate content of 10 to 80 percent by weight;

2. Polyalkylene oxides, preferably polymers of an alkylene oxide of three to four carbon atoms, such as polypropylene oxide, polybutylene oxide, propylene oxide/ethylene oxide random or block copolymers, and propylene oxide/allyl glycidyl ether copolymers; and 3. Polymers of vinyl chloride.

Such linear polymer is made present in the polymerization system in the form of a solution in an organic solvent in an amount of generally 10 to 500 percent by weight, preferably 10 to 100 percent by weight, based of the total amount of said monoethylenically unsaturated monomer (1) and diethylenically unsaturated monomer (2).

The organic solvent to be used in the process of this invention should meet the following requirements:

A. It dissolves the above mentioned linear polymer; and

B. It dissolves the foregoing monoethylenically unsaturated monomer (1) and diethylenically unsaturated monomer (2) but does not dissolve the cross-linked polymer produced and not the corresponding linear polymer free of the diethylenically unsaturated monomer (2), i.e. the linear polymer consisting only of the monoethylenically unsaturated monomer (1) used.

The class of the organic solvent to be used varies depending on the class of the linear polymer to be made present in the polymerization system and the classes of the monomers to be used, but an optional solvent selected from saturated aliphatic hydrocarbons such as hexane, liquid propane, liquid butane, heptane, cyclohexane, and hydrocarbon mixtures, e.g., petroleum benzine. petroleum ether, ligroine and kerosene; aromatic hydrocarbons such as benzene, xylene and toluene; linear or cyclic aliphatic ethers of up to eight carbon atoms such as diethyl ether tetrahydrofuran and dioxane; and aliphatic alcohols such as propanol and n-butanol may be used. It is also possible to use a mixture of two or more of such solvents. Of course, these organic solvents should be substantially inactive to the monomers to be used.

For instance, in case the linear polymer to be made present in the solution form is a vinyl chloride polymer, tetrahydrofuran is used as the solvent and in case the linear polymer is a hot heptane-soluble polyolefin, an aliphatic hydrocarbon such as n-heptane and kerosene or an aromatic hydrocarbon such as benzene is used. Further, in case the linear polymer is a polyalkylene oxide, any of the above cited solvents may be used optionally.

The foregoing monoethylenically unsaturated monomer (1) may be classified according to the class of the organic solvent to be used as a matter of convenience as follows:

I. To aliphatic hydrocarbons; acrylic acid, methacrylic acid, styrene-maleic anhydride, methacrylic acid ester-maleic anhydride, acrylic acid ester-acrylonitrile-glycidyl methacrylate, glycidyl methacrylate-vinyl chloride-acrylonitrile, maleic anhydride-vinyl toluene-acrylonitrile, 2-methyl-5-vinyl pyridine-methacrylic acid ester, styrene-glycidyl methacrylate, vinyl acetate-glycidyl acrylate, glycidyl acrylate-styrene, etc.

II. To aliphatic alcohols (for instance, butanol); acryl amide, acrylic acid, methacrylic acid, acryl amide-methacrylic acid, acryl amide-acrylonitrile, vinyl acetate-methacrylic acid, vinyl acetate-acrylic acid, vinyl acetate-acryl amide, etc.

III. To aromatic hydrocarbons; maleic anhydride, styrene-maleic anhydride, vinyl acetate-maleic anhydride, methacrylic acid, acrylic acid, maleic anhydride-acrylonitrile-styrene, acrylic acid-acrylonitrile, methacrylic acid-acrylonitrile, etc.

IV. To ethers (for instance, dioxane); acrylic acid-acrylonitrile, methacrylic acid-acrylonitrile, acrylic acid ester-acrylonitrile, acrylic acid ester-styrene, acrylic acid ester-vinyl chloride, acrylic acid ester-acrylo-nitrile-styrene, etc.

Those skilled in the art will easily select an optimum solvent to a combination of the linear polymer and monomers to be used by a simple experiment in accordance with the foregoing exemplification. The amount of the organic solvent to be used is not particularly critical if it is greater than 300 percent by weight based on the total amount of the monomers, but from the economical viewpoint it is preferable to use the organic solvent in an amount of 500 to 1,000 percent by weight based on the total amount of the monomers.

In accordance with the process of this invention, the above mentioned monoethylenically unsaturated monomer (1) and diethylenically unsaturated monomer (2) are polymerized in a specific organic solvent containing, dissolved therein, the above mentioned linear polymer. As the polymerization initiator there is used a free-radical initiator soluble in the organic solvent to be used. As such free-radical initiator there may be cited organic peroxides such as benzoyl peroxide, dicumyl peroxide, di-tert.-butyl peroxide and cumene peroxide, and azo compounds such as azobisisobutyronitrile. The initiator is used in a catalytic amount, for instance, 0.1 to 10 percent by weight based on the total amount of the monomers. The polymerization may be conducted in a customary manner in the deaerated system or by removing oxygen from the system by blowing in nitrogen. Temperatures adopted in the conventional radical polymerization methods are also adopted in the process of this invention, but it is preferred to carry out the polymerization at temperatures ranging from 50° C. to the boiling point of the solvent. Of course, in this invention the polymerization may be initiated by irradiation of ultraviolet rays or ionizing radical rays in accordance with conventional techniques instead of using the above mentioned azo compound or organic peroxide.

Thus, in accordance with this invention there can be obtained finely divided high polymers of a cross-linked structure having a particle diameter of less than 1 micron and containing a functional group selected from epoxy, acid anhydride, carboxyl, carboalkoxy, carbamoyl, acyloxy and nitrogen-containing heterocyclic groups. The finely divided high polymers obtained in accordance with the process of this invention have a remarkedly excellent dispersibility in organic solvents and resins, because they are prepared in the presence of a specific linear polymer uniformly dissolved in an organic solvent. In fact, in accordance with this invention, finely divided high polymers formed by the polymerization are obtained in the form of a stable suspensions in which the polymers are uniformly dispersed in organic solvents used, and the finely divided high polymers exhibit hardly any tendency of agglomeration or sedimentation. Further, even when one drop of the suspension of the finely divided high polymer prepared in accordance with the process of this invention is added, for instance, to 50 c.c. of an organic solvent and allowed to stand still, a good stable dispersion state can be maintained.

Further, while finely divided high polymers obtained in accordance with the above described known method by copolymerizing a monoethylenically unsaturated monomer with a diethylenically unsaturated monomer in an organic solvent free of the above mentioned specific linear polymer dissolved therein exhibit a structural property of forming bunches of particles, the finely divided high polymers prepared in accordance with this invention hardly exhibit such structural property.

Effects of this invention will be clearly seen from the appended drawings.

Suspensions of finely divided high polymers in organic solvents prepared in accordance with the process of this invention may be incorporated, as they are or after a part or all of the organic solvent has been removed by distillation, into various resins, for instance, polyolefins such as polypropylene, polyethylene, ethylene-propylene copolymers and ethylene-propylene-non-conjugated diene copolymers; vinyl chloride resins such as polyvinyl chloride and vinyl chloride-vinylidene chloride copolymers; acrylonitrile; and, polyesters such as polyethylene terephthalate. Thus, they can improve dyeability of these resins and impart a delustering effect to them. These effects may be attained sufficiently by incorporating into such resin 0.1 to 10 percent by weight of the finely divided high polymer of this invention.

Further, it is also possible to introduce into the finely divided high polymer of this invention dyestuffs, antioxidants, ultraviolet absorbents, and other polymer modifiers or additives by utilizing the functionality of the finely divided high polymer, and to blend such products into resins.

Still further, products obtained by introducing dyestuffs into the finely divided high polymer may be used in forms of suspensions in an organic solvent as olephilic inks excellent in stability to storing.

This invention will be described more detailedly with reference to examples.

Example 1

A three-neck distillation flask was charged with 15 g of an atactic ethylene-propylene copolymer having a molecular weight of about 7,000 and containing 3.7 percent by weight of ethylene units and 285 cc of n-heptane, and the atmosphere inside the flask was replaced by nitrogen. Then, the flask was placed into a thermostat maintained at 70° C., and the temperature inside the flask was raised while stirring to 70° C. to dissolve the atactic copolymer into n-heptane. A mixed solution of a vinyl monomer(s) indicated in Table 1 below in an amount also indicated in the table, 3 g of divinyl benzene and 1.2 g of benzoyl peroxide was charged into the flask and the polymerization was conducted for 5 hours. In each run, several minutes after the initiation of the polymerization the reaction liquor became opaque, and after completion of the polymerization there was obtained a highly viscous white slurry containing a finely divided, cross-linked high polymer. A small amount of each product was withdrawn to a sedimentation-test tube and diluted with n-heptane to conduct the sedimentation test. With respect to each product, the opaqueness did not disappear even after 24 hours in the sedimentation test.

TABLE 1

| Run number | Class | Vinyl monomer Amount used (percent) | Yield (percent) |
|---|---|---|---|
| 1 | Glycidyl methacrylate | 27 | 78 |
| 2 | Maleic anhydride / Styrene | 7 / 16 | 58 |
| 3 | Styrene | 30 | 54 |
| 4 | 2-methyl-5-vinyl pyridine / Acrylonitrile | 10 / 17 | 64 |
| 5 | Vinyl acetate | 27 | 25 |

The sample of Run No 1 which had been subjected to the sedimentation test was dropped on a collodion membrane and a photograph thereof was taken under an electron microscope at a magnification of 6,000. It is seen from this photograph that smallest particles possessed a particle diameter of less than 0.1 micron and that the product had an excellent dispersibility.

The slurry obtained by the polymerization in Run No. 1 was allowed to flow in a porcelain vat) and the solvent was removed by evaporation to obtain a solid mixture of the resulting finely divided high polymer and the atactic ethylene-propylene copolymer. The mixture was blended in an isotactic polypropylene in an amount such that the finely divided high polymer content would be about 3 percent, and the blend was molded into a pellet by means of an extruder. Then, the pellet was shaped into a film having a thickness of 0.35 mm. Thereafter, the film was dyed in a bath of Miketon Fast Orange (Color Index Number of 11005) (disperse dye) and a thin slice of the dyed film was photographed under a microscope at a magnification of 140. From this photograph it is seen that the finely divided high polymer is dispersed extremely uniformly in the resin.

Comparative Example 1

Run No. 1 of Example 1 was repeated without the use of polymer. The yield of the finely divided high polymer was 88 percent. The product was subjected to the sedimentation test. In about 5 seconds, the finely divided high polymer was precipitated. The precipitated system was agitated again to make the high polymer particles floating in the system again, and dropped on a collodion membrane.

Example 2

13.5 G of maleic anhydride, 13.5 g of styrene, 3 g of divinyl benzene and 35 g of an atactic polypropylene having a molecular weight of about 20,000 were dissolved into 300 cc of benzene, and the solution was polymerized for 5 hours at 70° — 75° C. with the use of 1.2 g of benzoyl peroxide as an initiator in the open air. Several minutes after the initiation of the polymerization the system became opaque, and one hour after the initiation of the polymerization the system bean to take a form of a highly viscous slurry. The yield was 86 percent. The resulting slurry was placed into a porcelain vat to remove the solvent therefrom. A small amount of remaining solid was dry blended in a mixer into powders of isotactic polypropylene, polyvinyl chloride, polystyrene and polymethyl methacrylate, separately. Each blend was molded into a pellet by means of an extruder and shaped into a film of a 0.35 mm thickness. Each film was dyed in the same manner as in Example 1 and extracted with acetone. As a result of the observation under a microscope it was confirmed that in each sample the finely divided high polymer was extremely uniformly dispersed in the resin.

Comparative Example 2

The polymerization was conducted in the same manner as in Example 2 in the absence of the atactic polypropylene. The yield of the finely divided high polymer was 91 percent. A small amount of the high polymer was dry blended in a mixer into powder of isotactic polypropylene, and the blend was molded into a pellet by means of an extruder and shaped into a film in the same manner as in Example 2. As a result of the observation of the film under a microscope, the existence of agglomerated particles was confirmed. During the dry blending step the finely divided, cross-linked high polymer was electrostatically fixed to the wall of the mixer.

Example 3

10 G of 2-methyl-5-vinyl pyridine, 17 g of acrylonitrile, 3 g of divinyl benzene and 30 g of a low molecular weight polyethylene having an average molecular weight of 5,400 were added into 300 cc of benzene. After the atmosphere had been replaced by nitrogen, the system was placed into a thermostat maintained at 70° – 72° C. and let to stand in this state for a period of time sufficient to dissolve the low molecular weight polyethylene. Then, 2.2 g of benzoyl peroxide was added to the system and the polymerization was conducted for 5 hours. As a result there was obtained a yellowish slurry in which a finely divided high polymer was dispersed uniformly. The monomer conversion was 48 percent. When the system was allowed to cool to room temperature, the precipitation of the low molecular weight polyethylene was observed. A small amount of the dispersion was thrown into a great excess of benzene, and the resulting mixed suspension was dropped on a carbon vacuum evaporation membrane and observed under an electron microscope of a magnification of 10,000 . From the photograph it is seen that particles of the finely divided, cross-linked high polymer were embraced with the polyethylene and dispersed therein in a rice grain-like form.

The above slurry containing the finely divided high polymer was thrown into a great excess of methanol and filtrated, followed by washing with methanol and drying. The resulting solid was blended into a high density polyethylene in an amount such that the content of the finely divided high polymer would be about 3 percent. The blend was molded into a pellet by means of an extruder and treated in the same manner as in Example 1. As a result of the observation under a microscope it was confirmed that the finely divided, cross-linked high polymer was dispersed uniformly in the polyethylene and that the polyethylene embracing the finely divided high polymer in such a good dispersion condition as shown in FIG. 2 was precipitated while it was cooling:

Example 4

7.5 G of maleic anhydride, 5 g of styrene, 2.5 g of divinyl benzene and 7 g of polypropylene oxide having an intrinsic viscosity of 3.2 dl/g measured in benzene at 35° C. were dissolved in 140 ml of benzene at 79° C. under a nitrogen atmosphere while stirring, followed by addition of 1.0 g of benzoyl peroxide dissolved in 10 ml of benzene. The polymerization was conducted at 79° C. for 6 hours. As a result there was obtained a white slurry containing a finely divided high polymer and being rich in flowability at a monomer conversion of 92 percent. A small amount of the slurry was taken into a sedimentation test tube and diluted with benzene. Even after the diluted liquor had been allowed to stand for a weak, no sedimentation was observed. The diluted liquor was further diluted and dropped on a carbon vacuum evaporation membrane. Thus, a photograph was taken under an electron microscope. From the photograph it is seen that a greater particles had a particle size of about 0.3 micron and smaller particles have a size of less than 0.03 micron, said size being so small that electron rays would almost pass therethrough.

Comparative Example 3

The polymerization was conducted under the same conditions as in Example 4 in the absence of the polypropylene oxide. As a result there was obtained a polymerization product of a slurry containing a bulky, finely divided high polymer at a yield of 95 percent. At the sedimentation experiment, the high polymer was completely sedimented within 24 hours. A small amount of the slurry used for the sedimentation test was diluted with benzene and subjected to an irradiation of supersonic waves of 400 KC and 50 W at 25° – 50° C. for 2 minutes and 30 seconds. Then, the so treated diluted liquor was dropped on a collidion membrane having a carbon vacuum evaporation membrane thereon, and a photograph was taken under an electron microscope. From this photograph it is seen that the high polymer synthesized in the absence of the propylene oxide is present in the form of agglomerated particles having a much greater size than that of the finely divided high polymer prepared in Example 4.

Example 5

17 G glycidyl methacrylate, 9 g of acrylonitrile, 4 g of divinyl benzene and 15 g of polypropylene oxide ($(\eta) = 3.2$) were added into 300 cc of n-heptane, and the mixture was placed in a thermostat maintained at 70° – 72° C. and stirred under a nitrogen atmosphere to dissolve the above components into the solvent. Then, 1.2 g of benzoyl peroxide was added to the solution and the polymerization was conducted for 5 hours. The monomer conversion was 73 percent. After completion of the polymerization, the reaction product was taken into a porcelain vat and dried in the air at room temperature, followed by drying in vacuo. A small amount of the dried product was mixed and kneaded with polypropylene oxide (the finely divided high polymer content being about 3 percent) by means of a roller. Then, the resulting massy product was dyed under the same conditions as in Example 1, and the excessive dyestuff not reacted with the glycidyl group was removed by extraction with methanol. After conducting the drying, the dyed product was fixed on a thin plate of polypropylene, cooled by dry ice and methanol maintained at −50° C. and cut into thin slices by means of a microtome. As a result of the observation of such slice under a microscope it was confirmed that the finely divided high polymer was dispersed quite uniformly.

Example 6

13 G of methyl methacrylate, 14 g of acrylonitrile, 3 g of divinyl benzene and 15 g of polyvinyl chloride powder (having a molecular weight of about 10,000 were added into 300 cc of dioxane, and the mixture was stirred at 70° – 72° C. under a nitrogen atmosphere. After the polyvinyl chloride powder had been dissolved 1.2 g of benzoyl peroxide was added to the system and the polymerization was conducted for 5 hours. After completion of the polymerization there was obtained a slightly greyish white slurry at a yield of 32 percent. To the slurry was added 50 g of dioctyl terephthalate as a plasticizer and then the slurry was placed into a vat where the solvent was removed by distillation to obtain a sheet-like polyvinyl chloride composition containing a finely divided, cross-liked high polymer. The said sheet-like polyvinyl chloride composition was blended with another polyvinyl chloride in an amount such that the content of the finely divided high polymer would be about 3 percent, and the blend was kneaded at 150° - 160° C. by means of a mixing roll. Then, the blend was recovered in the form of a sheet and dyed in the same manner as in Example 1. As a result of the observation under a microscope it was confirmed that the finely divided high polymer was dispersed quite uniformly.

Comparative Example 4

Example 6 was repeated by employing as solvent n-heptane instead of dioxane. As polyvinyl chloride was not dissolved in the solvent but suspended therein. After completion of the polymerization, there was obtained a homogeneous mixture of the polyvinyl chloride and a finely divided, cross-linked high polymer. A part of the resulting mixture was dissolved into dioxane and the sedimentation test thereof was conducted in the same manner as in Example 1. Only several minutes the finely divided high polymer was sedimented. When the slurry obtained in Example 6 was similarly subjected to the sedimentation test, any sedimentation was hardly observed even after 24hours.

Example 7

12 G of 4-vinyl pyridine, 15 g of methylacrylate, 3 g of divinyl benzene and 30 g of an atactic polypropylene having a molecular weight of about 20,000 were added into 300 cc of cyclohexane, and the atactic polypropylene was dissolved under a nitrogen atmosphere by maintaining the temperature at 70° – 72° C., followed by addition of 1.2 g of benzoyl peroxide. The polymerization was conducted for 3.5 hours. As a result there was obtained a slightly yellowish white slurry in which a finely divided high polymer was dispersed quite uniformly. The yield was 47 percent. The slurry was placed in a porcelain vat and the solvent was removed by distillation. The remaining solid was dry blended in a mixer into powder of an isotactic polypropylene in an amount such that the content of the finely divided high polymer would be about 3 percent. The blend was molded to a pellet by means of an extruder and shaped into a film having a thickness of 0.35 mm. As a result of the observation of a photograph of the section of the dyed film taken in the same manner as in Example 1, it was confirmed that the finely divided high polymer was present exhibiting an excellent dispersibility.

Example 8

27 G of glycidyl methacrylate, 3 g of divinyl benzene and 30 g of a low molecular weight, honey-line copolymer of isobutene and 1-butene having an average molecular weight of 5,700 were dissolved into 300 cc of heptane. The atmosphere was replaced by nitrogen and the temperature was raised to 70° – 72° C., followed by addition of 1.2 g of benzoyl peroxide.

The polymerization was conducted for 3 hours. Several minutes after initiation of the polymerization the formation of a white slurry took place, and at completion of the polymerization the system was converted to a highly viscous slurry containing a finely divided high polymer. The yield was 75 percent.

The solvent was removed from the slurry by distillation in a porcelain vat, and the remaining solid was kneaded with an isotactic polypropylene in an amount such that the content of the finely divided high polymer would be about 3 percent. As a result of the observation of the dispersion state of the finely divided high polymer it was confirmed that the high polymer was dispersed in a good condition, though it was a little inferior to the dispersion condition in the product of Example 1.

Example 9

7.5 G of maleic anhydride, 6 g of styrene, b 1.5 g of divinyl benzene and 8 g of polybutene having an average molecular weight of 570 were charged into a reactor together with 140 ml of benzene. The atmosphere inside the reactor was replaced by nitrogen and the temperature was raised to 79° C. to form a homogeneous solution. Then, 0.6 g of benzoyl peroxide and 10 ml of benzene were charged into the reactor, and the polymerization was conducted for 5 hours.

After completion of the polymerization, the solvent was removed from the resulting slurry. As a result there was obtained a waxy mixture of the polybutene and a finely divided high polymer. The yield was 82 percent. The mixture was blend into an isotactic polypropylene in an amount such that the content of the finely divided high polymer would be about 3 percent. Then, the dispersibility was examined in the same manner as in Example 1 and it was confirmed that the finely divided high polymer was present with an excellent dispersibility Example 10

26 G of glycidyl methacrylate, 4 g of divinyl benzene, 30 g of an atactic ethylene-propylene copolymer having a molecular weight of about 7,000 and containing 3.7 percent by weight of ethylene units, 1.6 g of benzoyl peroxide and 270 cc of n-heptane were charged into a pressure-resistant glass reactor equipped with a stirrer. After the atmosphere inside the reactor had been replaced by nitrogen, the temperature was raised and the polymerization was conducted at 86° – 87° C. for about 7 hours. During the polymerization the pressure inside the reactor was 4.7 Kg/cm². As a result there was obtained a white opaque slurry at a yield of 80 %. The slurry was placed in a porcelain vat and dried in the air. Thus, there was obtained a white powder consisting of a finely divided high polymer sprinkled on the waxy atactic copolymer. The powder was blended to powder of an isotactic polypropylene in an amount such that the content of the finely divided high polymer would be about 3 %. Then, the blend was extruded and shaped into a film having a thickness of 0.35 mm. The film was dyed in the same manner as in Example 1 and the section thereof was observed under a microscope. As a result, it was confirmed that the finely divided high polymer was present in the uniformly dispersed state in the form of particles of a diameter of less than 0.5μ.

Example 11

27 G of glycidyl acrylate, 3 g of divinyl benzene, 9 g of polyoxyethylene alkyl ether (Emargen, product of Kao Atlas Co.) and 15 g of a low molecular weight polyethylene having an average molecular weight of 5,400 were added into 235 cc of n-heptane, and the system was mixed while stirring at 80° C. under a nitrogen atmosphere to dissolve the low molecular weight polyethylene. Then, 1 g of benzoyl peroxide was flown into the system together with 20 cc of n-heptane. The polymerization was conducted for 5 hours. A white slurry containing a finely divided high polymer was obtained at a yield of 64 %. The slurry was placed in a porcelain vat and the solvent was removed therefrom at room temperature. The remaining solid was blended into polypropylene in an amount such that the content of the high polymer would be about 3 percent. The blend was molded into a pellet by means of an extruder and then the dispersion state was observed under a microscope in the same manner as in Example 1. It was confirmed that the finely divided high polymer was quite uniformly dispersed.

Example 12

7.5 G of maleic anhydride, 6 g of styrene, 1.5 og of divinyl benzene, 4 g of polyoxyethylene alkyl ether (Emargen, product of Kao Atlas Co.), 7.5 g of a low molecular weight polyethylene having a molecular weight of about 2,000 and 100 ml of benzene were charged into a reactor. The mixing was conducted under a nitrogen atmosphere at 79° C. until the low molecular weight polyethylene and maleic anhydride had been dissolved. Thereafter, 0.5 g of azobisisobutyronitrile dissolved in 10 ml of benzene was added into the reactor and the polymerization was conducted for 2 hours to obtain a slurry at a yield of 66 percent. The slurry was treated in the same manner as in Example 11 to examine the dispersion state. As a result it was observed that a finely divided high polymer was dispersed quite uniformly in the product.

Example 13

15 G of 1-methyl-2-vinyl imidazole, 12 g of methyl methacrylate and 3 g of divinyl benzene were added to a solution of 30 g of a low molecular weight polyethylene having a molecular weight of about 2,000 in 220 cc of n-heptane maintained at 80° C. Then, 1 g of benzoyl peroxide was added together with 20 cc of n-heptane to the system under a nitrogen atmosphere while stirring, and the polymerization was conducted for 5 hours. A slurry was obtained at a yield of 27 percent. The dispersibility was examined in accordance with the procedures adopted in Example 1. As a result, it was confirmed that finely divided high polymer was quite uniformly dispersed in the product.

Example 14

15 G of maleic anhydride, 12 g of styrene and 3 g of divinyl benzene were dissolved into a solution of 15 g of a low molecular weight isotactic polypropylene having a molecular weight of about 8,000 (obtained by thermally decomposing a high molecular weight isotactic polypropylene having a melt index of 12 at 350° C. in vacuo) in 235 cc of benzene maintained at 80° C., followed by addition of 1 g of benzoyl peroxide dissolved in 20 cc of benzene. The polymerization was conducted for two hours to obtain a slurry at a yield of 89 percent. The dispersibility was examined in the same manner as in Example 1 and it was confirmed that a finely divided high polymer was dispersed quite uniformly in the product.

Example 15

The polymerization was conducted in the same manner as in Example 1 except using 25 g of vinyl acetate and 5 g of divinyl benzene to obtain a product at a monomer conversion of 21 %. The dispersibility was examined in the same manner as in Example 1 and it was confirmed that a finely divided high polymer was quite uniformly dispersed in the product.

Example 16

Run No. 1 was repeated by effecting the initiation of the polymerization by means of a ultraviolet lamp irradiation without using benzoyl peroxide, and the polymerization was conducted at 25° C. for 30 hours. The yield was 53 percent. The resulting finely divided high polymer exhibited an excellent dispersibility equivalent to that of the high polymer of Example 1.

Example 17

270 G of glycidyl methacrylate, 30 g of divinyl benzene and 150 g of an atactic ethylene-propylene copolymer having a molecular weight of about 7,000 and containing 3.7 percent by weight of ethylene units were dissolved in 2,500 cc of n-heptane at 80° C. The polymerization was conducted for 5 hours at 80° C. Under a nitrogen atmosphere while stirring with the use of 9 g of benzoyl peroxide as an initiator. The yield was 82 percent. The reaction product was placed in a porcelain vat and the solvent was removed by distillation. The resulting atactic copolymer composition containing a finely divided high polymer was kneaded in Bumburry's mixer for 5 minutes with a polypropylene pellet (having a melt index of 6.5 g/min at 230° C.) containing 2 percent of 2,5-di-tert.-butyl-hydroxyl toluene and 4 percent of dilauryl thiodipropionate as antioxidants, and then, the mixture was subjected to an action of a crusher to obtain a chip-like polypropylene composition containing 3 percent of a finely divided high polymer. Then, the composition was spun at 260° C. and drawn at a draw ratio of 4 at 125° C. to obtain a filament (A) of 3 deniers. Separately, the polymerization was conducted in the same manner as above in the absence of the atactic copolymer, and the resulting polymeric composition was blended spun and drawn in the same manner as above to obtain a filament (B). When both filaments were dyed under the same dyeing conditions, the filament (A) had considerably excellent color and luster as compared with the filament (B). Further, the filament (A) exhibited an improved dye exhaustion.

Dyeing were conducted at a dyestuff concentration of 3 percent o.w.f. in a water bath containing a soap (Monogen, product of Daiichi Kogyo Seiyaku K. K.) a concentration of 1 g/l at a bath ratio of 40, at a temperature of 120° C. for 2 hours. The results are shown in Table 2 below.

TABLE 2

| Filament | Dyestuff | Dyestuff exhaustion | Average particle size of high polymer in filament |
|---|---|---|---|
| (A) | Miketon Fast Orange GR | 63% | less than 0.5–0.6 micron |
| (B) | Miketon Fast Orange GR | 50% | less than 2–3 microns (agglomerated) |

Example 18

5 G of an atactic polypropylene having a molecular weight of about 41,000 and 100 ml of kerosene were charged into a reactor. The atmosphere inside the reactor was replaced by nitrogen, and the temperature was raised to 118° C. while stirring until the atactic polypropylene was completely dissolved in kerosene to form a transparent solution. 10 G of a mixture of glycidyl metharcylate and divinyl benzene (divinyl benzene content being 10 percent by weight) containing, dissolved therein, 0.3 g of benzoyl peroxide was added to the reactor by means of an injector, and the polymerization was conducted for 1.5 hours. Just after the addition of the monomer mixed liquor, the system took the form of a milky, uniform dispersion and this state was maintained throughout the polymerization. In order to terminate the polymerization, 0.3 g of a polymerization inhibitor (2,5-di-tert.-butyl cresol) was added to the polymerization system, followed by cooling. As the system was cooled, the atactic polypropylene was precipitated and the system became jellied. The jellied product contained a finely divided high polymer dispersed in the atactic polypropylene. The jellied product was well mixed with an isotactic polypropylene in heptane in a manner such that the content of the finely divided high polymer of the jellied product would be about 3 percent, followed by filtration. To the residue was added about 10 ml of an ether solution containing about 0.2 percent, based on the isotactic polypropylene of 2,5-di-tert.-butyl cresol. Then, they were well mixed, and the solvent was removed therefrom. Thereafter, the remaining mixture was molded into a pellet by means of an extruder. Then, the dispersibility of the finely divided high polymer was examined in the same manner as in Example 1 and it was confirmed that the high polymer was dispersed uniformly in a finely divided state in the product.

Example 19

The polymerization was conducted in the same manner as in Example 19 except using an atactic ethylene-propylene copolymer having a molecular weight of about 60,000 instead of the atactic polypropylene and ligroin (fraction at 120° - 130° C.) as the solvent. It was confirmed that a finely divided high polymer was uniformly dispersed in the product in a fine state as was observed in Example 18.

Example 20

10 G of a 5 : 4 : 1 (by weight) mixture of acrylic acid amide, styrene and divinyl benzene 5 g of polypropylene oxide having an intrinsic viscosity of 3.2 were dissolved in 100 ml of a 70 : 30 (by weight) mixed solvent of heptane and isopropanol, followed by addition of 0.3 g of benzoyl peroxide. The polymerization was conducted at 75° C. for 5 hours. The yield was 76 percent. The polymerization product was subjected to the dispersibility examination test in the same manner as in Example 1, and it was confirmed that a finely divided high polymer was dispersed quite uniformly.

Example 1

10 G of a 4.5 : 4.5 : 1 (by weight) mixture of acrylic acid, methyl methacrylate and divinyl benzene and 5 g of an ethylene-vinyl acetate copolymer (Ultracene, product of Japan Polychemical Co.; ethylene content = 72 percent by weight) were dissolved into 100 ml of kerosene, followed by addition of 0.3 g of benzoyl peroxide. The polymerization was conducted at 80° C. for 2.5 hours. The yield was 88 percent. The dispersibility examination test was conducted in the same manner as in Example 1, and it was confirmed that a finely divided high polymer was uniformly dispersed in a good state.

What we claim is:

1. In a process for the preparation of finely divided high polymers of a cross-linked structure comprising polymerizing
   1. at least one radical-polymerizable monoethylenically unsaturated monomer having an epoxy functional group; and
   2. 0.5 to 30 percent by weight, based on the weight of said monoethylenically unsaturated monomer (1), of a diethylenically unsaturated monomer, in an organic solvent which dissolves said monomers (1) and (2) but not the cross-linked polymer produced therefrom and not the corresponding linear polymer free of said diethylenically unsaturated monomer (2) in the presence of a free-radical initiator; the improvement wherein prior to the polymerization a linear hot n-heptane soluble monoolefin polymer is dissolved in said organic solvent in an amount of 10 to 500 percent by weight based on the total weight of monomers (1) and (2).

2. The process of claim 1 wherein said organic solvent is present in an amount of more than 300 percent by weight based on the total weight of the monomers.

3. The process of claim 1 wherein said organic solvent is selected from the group consisting of aliphatic hydrocarbons, aliphatic alcohols of up to 8 carbon atoms, and linear or cyclic aliphatic ethers.

4. The process of claim 1 wherein said monoethylenically unsaturated monomer (a) is a glycidyl ester of an ethylenically unsaturated carboxylic acid.

5. The process of claim 1 wherein said monoolefin polymer is expressed by the formula:

wherein $R_1$ represents hydrogen, an alkyl group of up to 4 carbon atoms or phenyl; and $R_2$ represents hydrogen or an alkyl group of up to 4 carbon atoms.

6. The process of claim 1 wherein said monoethylenically unsaturated monomer is glycidyl methacrylate; said monoolefin polymer is an atactic ethylene-propylene copolymer; and said diethylenically unsaturated monomer is divinyl benzene.

* * * * *